United States Patent [19]

Gram et al.

[11] Patent Number: 4,761,208
[45] Date of Patent: Aug. 2, 1988

[54] ELECTROLYTIC METHOD AND CELL FOR STERILIZING WATER

[75] Inventors: Helen F. Gram; Martin E. Muller; Ann M. Pendergrass, all of Los Alamos, N. Mex.; Philip A. Rink, Everett, Wash.

[73] Assignee: Los Alamos Technical Associates, Inc., Los Alamos, N. Mex.

[21] Appl. No.: 913,844

[22] Filed: Sep. 29, 1986

[51] Int. Cl.[4] .............................................. C25G 1/24
[52] U.S. Cl. ...................................... 204/95; 204/128; 204/129; 204/149; 204/151; 204/263; 204/275; 204/292; 204/243
[58] Field of Search ............... 204/257, 261, 263, 266, 204/94, 95, 242, 149, 293, 275, 151, 128–129

[56] References Cited

U.S. PATENT DOCUMENTS

| | | | |
|---|---|---|---|
| 3,443,055 | 5/1969 | Gwynn | 219/83 |
| 3,622,479 | 11/1971 | Schneider | 204/149 |
| 3,649,493 | 3/1972 | Meiners et al. | 204/157.1 |
| 4,209,368 | 6/1980 | Coker et al. | 204/98 |
| 4,230,571 | 10/1980 | Dadd | 210/760 |
| 4,236,992 | 12/1980 | Themy | 204/278 |
| 4,308,117 | 12/1981 | Sweeney | 204/101 |
| 4,432,856 | 2/1984 | Murakami et al. | 204/95 |
| 4,488,945 | 12/1984 | Spaziante | 204/95 |
| 4,555,323 | 11/1985 | Collier | 204/258 |

OTHER PUBLICATIONS

"Rapid, Safe Drinking Water Supply Production Method", U.S. Army Report #DAAK-70-82-C-0045, 4-1-83.
"Electrolyte Sterilization of Portable Water on Shipboard", U.S. Navy Report #N 00167-85-C-001.
"Morphology of Dimensionally Stable Anodes" by K. J. O'Leary and T. J. Navin, Diamond Shamrock Corporation in *Chlorine Bicentennial Symposium*, The Electrochemical Society, Inc., pp. 174–186 (1974).
"Metal Anodes" by H. Stuart Holden and James M. Kolb, Kirk–Othmer: *Encyclopedia of Chemical Technology*, vol. 15, Third Edition, pp. 175–183, (1981).
Pamphlet: *"Bacteria-Free Water, Therapeutic Water, Electrolytically"*, manufacturer, Ster-O-Lizer Manufacturing Corporation (Mar. 1984).
Pamphlet: *"Sanilec® Systems, On-Site Sodium Hypochlorite Generators"*, manufacturer, Eltech Systems Corporation.
Pamphlet: *"TIR-2000 Coating, Performance Factors"*, manufacturer, Electrode Corporation, a Subsidiary of Eltech Systems Corporation.
Pamphlet: *"Advancing the Frontiers of Elecrochemical Technology"*, manufacturer, Eltech Systems Corporation.

*Primary Examiner*—R. L. Andrews
*Attorney, Agent, or Firm*—Deborah A. Peacock; Robert W. Weig

[57] ABSTRACT

Electrolytic cell and low-voltage method for sterilizing water. The electrolytic cell of the invention contains a cathode and an anode which produce oxidants to effect sterilization of contaminated water. The anode is made of a Group VIII metal or compound thereof which acts as a catalyst to produce oxidants. In the method of the invention, a salt solution is introduced into the electrolytic cell, oxidants are produced in solution, and the anode effluent stream is introduced directly into the water to be treated.

21 Claims, 3 Drawing Sheets

ELECTROLYTIC METHOD AND CELL FOR STERILIZING WATER

This invention was made with government support under contract No. DAAK-70-82-C-0045 awarded by U.S. Army Mobility Equipment Research and Development Command and Contract ID Code N 00167-85-C-0001 awarded by David Taylor Naval Ship Research & Development Center. The Government has certain rights in this invention.

BACKGROUND OF THE INVENTION

This invention relates to an electrolytic method and device for sterilizing water. The device of the invention essentially produces germicidal agents by low-voltage electrolysis of an electrolytic solution, such as a weak aqueous sodium chloride solution. The germicidal components are produced in solution and are directly mixed with the contaminated water.

Prior art water sterilization methods generally involve large centrally located facilities. Highly toxic chlorine gas is dissolved in water and this solution is mixed with the contaminated water. The use of free chlorine gas and a difficulty in dissolving the chlorine in the water are problems with utilizing this prior art technology.

An alternative to the use of free chlorine, in prior art water sterilization methods, is the use of sodium hypochlorite. Although sodium hypochlorite has a germicidal effect similar to free chlorine, it is less effective than chlorine and the water retains a significant chlorine odor due to the preservatives generally added to maintain the hypochlorite.

Other prior art methods for sterilizing water comprise the use of actinic radiations, such as an ultraviolet radiation source, placed near the contaminated water. Such methods are disclosed in U.S. Pat. No. 4,230,571 to Dadd, entitled OZONE/ULTRAVIOLET WATER PURIFICATION and U.S. Pat. No. 3,649,493 to Meiners, et al., entitled PROCESS OF PURIFYING WATER WITH ACTIVE HALOGEN COMPOUND AND ACTINIC RADIATIONS.

Conventional shipboard methods for sterilizing water include the use of bromine ion exchange resins and granular calcium hypochlorite. These methods are generally not effective in killing highly resistant microorganisms.

Recent developments in the prior art include the use of electrolysis to generate oxidants, which act as germicidal agents. One such electrolytic unit, manufactured by Oxidizers, Inc. (previously Ozone Technology Corporation) of Virginia Beach, Va., is reported to produce a gaseous mixture of ozone, chlorine, free radicals of oxygen and chlorine, and hydrogen peroxide. These gases are then introduced into the water to be treated. Since these gases are strong oxidants, they are very dangerous to work with. As previously noted, there also are technical difficulties associated with dissolving these gases into an aqueous medium. Other prior art electrolytic cells and systems which produce gaseous oxidants which are then introduced into the contaminated water are disclosed in: U.S. Pat. No. 4,555,323 to Collier, entitled CHLORINATION DEVICE; U.S. Pat. No. 4,308,117 to Sweeney, entitled GENERATION OF CHLORINE-CHLORINE DIOXIDE MIXTURES; and U.S. Pat. No. 4,236,992 to Themy, entitled HIGH VOLTAGE ELECTROLYTIC CELL.

In more recent developments in the prior art, electrolysis occurs in the aqueous medium, thereby removing the previously required step of dissolving the gases. Three prior art devices of this type are: Ster-O-Lizer ® manufactured by Ster-O-Lizer Manufacturing Corp., Salt Lake City, Utah; Sanilec ® Systems manufactured by Eltech Systems, Corp., Chandon, Ohio; and the device disclosed in U.S. Pat. No. 3,622,479 to Schneider, entitled METHOD FOR THE CONTINUOUS ELECTROLYTIC PRODUCTION OF CHLORINE FOR THE STERILIZATION OF WATER. Some of the oxidants that are produced by this method likely include: fresh nascent chlorine, ozone, hypochlorite and free radicals. However, all of these devices utilize the unseparated anode and cathode products as a sterilizing solution, thereby decreasing the germicidal effects. When the Ster-O-Lizer ® and Sanilec ® devices are used, the sterilizing solution is stored before introduction into the contaminated water, thereby allowing degradation of some of the oxidants contained in the solution. The '479 patent teaches fragmenting the electrolytic solution into electrically nonconducting drops before it is electrolyzed.

Prior art sterilization techniques are limited in their ability to treat certain pathogenic organisms. For example, *Legionella pneumophilia* and *Giardia muris* are two pathogenic organisms which are extremely resistant to prior art sterilization techniques.

Accordingly, it is a primary object of the present invention to provide a low-voltage method and device which provide increased germicidal effects over the prior art.

It is a further object of the present invention to provide a device which is inexpensive to manufacture, durable, compact, and easy to operate.

Other objects and further scope of applicability will become apparent from the detailed description to follow, along with the accompanying drawing.

SUMMARY OF THE INVENTION

The present invention relates to an improved electrolytic cell and method for sterilizing water. The invention kills microorganisms more effectively than prior art systems, and provides a method for verifying treatment and maintaining sterilization.

The electrolytic cell of the invention comprises an anode and a cathode. The surface of the anode, or the entire anode, is made of a Group VIII metal which serves as a catalyst for the generation of oxidants at the electrode/electrolyte interface.

An electrolyte, useful in the operation of the invention, is formed by mixing a soluble salt into water. Seawater, if available, may be used directly as the electrolyte. When sodium chloride is used, in accordance with the invention, the salt content of the water preferably ranges between 0.1 grams/liter and the saturation value, approximately 355 grams/liter (0.0017M and 6.1M, respectively), and most preferably between 20 grams/liter and 35 grams/liter (0.34M and 0.60M, respectively).

The electrolytic cell design preferably further comprises a barrier for separating the anode effluent area from the cathode effluent area, and for directing the flow of the electrolyte. This division is important because it is preferable to utilize only the anode effluent stream as the oxidant or sterilizing stream to obtain maximum sterilization.

Oxidants are produced at the anode, but may appear unequally in both effluent streams. These mixed oxidants react synergistically to enhance the sterilization effects.

The anode effluent stream, produced in accordance with the invention, is preferably introduced into contaminated water within ten minutes, and most preferably within five minutes. The cathode stream is preferably discarded for sterilization purposes. The preferred ratio of volume of anode effluent, produced in accordance with the invention, to volume of contaminated water is 1:1 to 1:5000. This ratio depends on the degree of contamination of the water and the concentration of the electrolyte solution.

In a preferred method of the invention, a portion of the contaminated water is used to make the electrolyte, by adding a soluble salt to this stream. Thus, distilled water, which may not be available in field conditions, is not necessary for operation of the device of the invention.

DESCRIPTION OF THE PREFERRED EMBODIMENT

This invention relates to an improved method and device for the sterilization or disinfection of water. Oxidants are produced at the electrode/electrolyte interface; these oxidants react synergistically to kill or attenuate bacteria, spores, cysts, viruses, algae, and other microorganisms, and to oxidize sulfides, cyanides, and other organic and inorganic substances. The invention is also useful in treating water streams having a high particulate or organic content.

Figure 1:
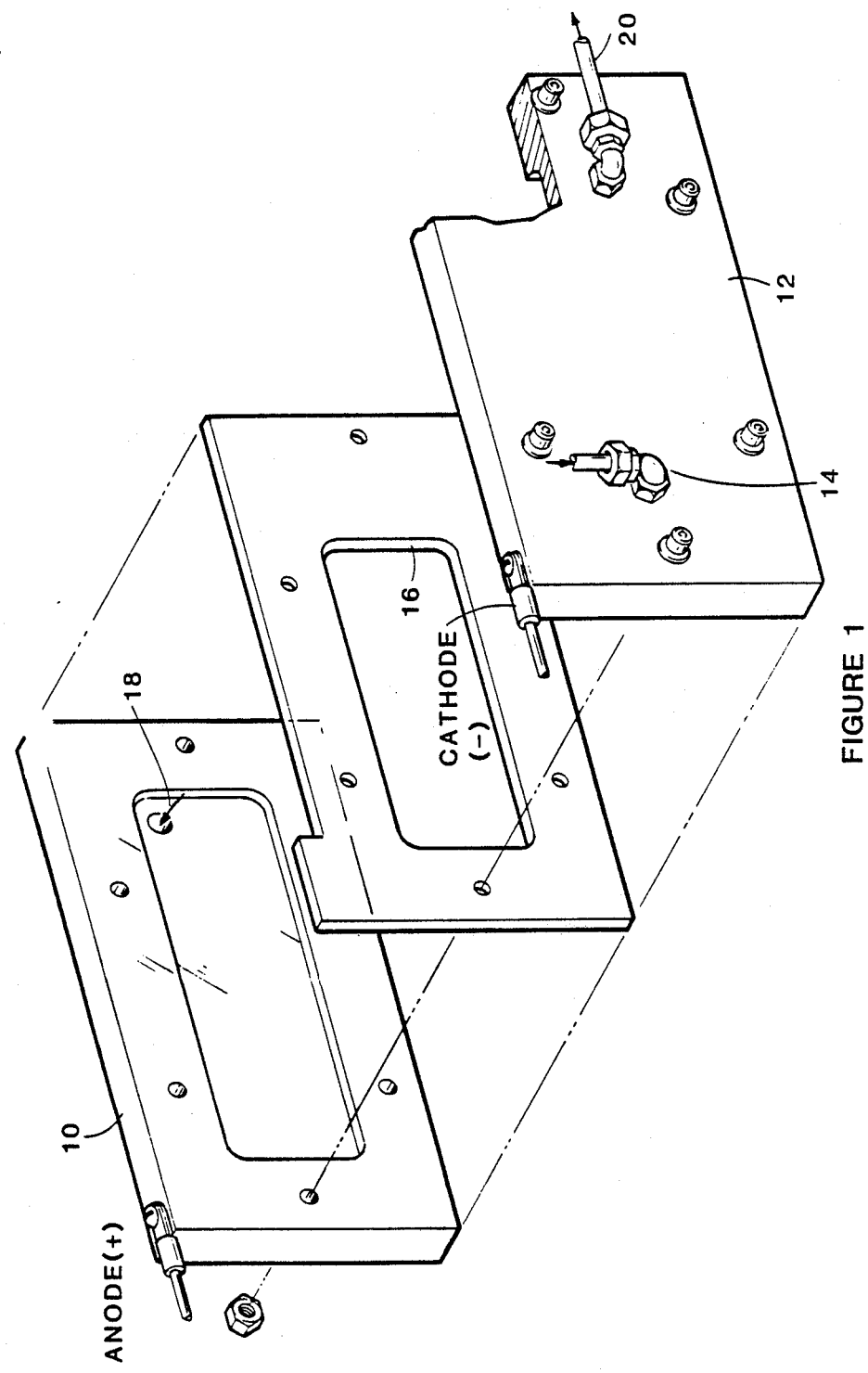
FIG. 1 of the drawing is an exploded perspective view of the preferred electrolytic cell of the present invention.

FIG. 1 of the drawing is an exploded perspective view of the preferred device or electrolytic cell of the invention. The electrolytic cell comprises an anode 10 and a cathode 12. The surface of the anode comprises a Group VIII (Periodic Table of the Elements) metal, such as platinum, iridium, rhodium, or ruthenium or compound thereof. Group VIII metals and their compounds are highly resistant to corrosion and do not dissolve easily, even in the presence of highly corrosive oxidants such as chlorine and hypochlorites. In addition, Group VIII metals and their compounds serve as catalysts to improve the electrolytic formation of oxidants at the electrode-electrolyte interface. Any conducting material could feasibly be utilized for the anode and cathode in the electrolytic cell of the invention, however, the corrosion resistance and catalytic effects of Group VIII metals and their compounds make such materials highly preferable, especially for the anode. The anode may be entirely made of the Group VIII metal or its compounds, or it may be a composite electrode, common to the art, with a Group VIII metal or its compounds coating. Titanium is a useful substrate material in composite anodes. Such anodes are often termed precious metal anodes (PMA), noble-metal-coated titanium anodes (NMT), dimensionally stable anodes (DSA), and platinized titanium anodes (PTA). U.S Pat. No. 3,547,600, to Gwynn et al., entitled COMPOSITE ELECTRODE HAVING A BASE OF TITANIUM OR COLUMBIUM, AN INTERMEDIATE LAYER OF TANTALUM OR COLUMBIUM AND AN OUTER LAYER OF PLATINUM GROUP METALS; and U.S Pat. No. 3,443,055 to Gwynn, et al., entitled LAMINATED METAL ELECTRODES AND METHOD FOR PRODUCING THE SAME, both disclose electrode compositions which are useful as anode materials in the present invention.

In one embodiment of the invention, both the anode and cathode surfaces of the electrolytic cell of the invention are made of Group VIII metals or their compounds. If both electrode surfaces are made of the same Group VIII metal, the poles may be reversed on the electrolytic cell, thus changing the anode to the cathode and vice versa, and thereby effecting a more even wear of the electrodes and preventing a buildup of deposits on either electrode.

Preferably, the anode 10 and cathode 12 comprise the walls of the electrolytic cell of the invention. The cathode 12 shown in FIG. 1 contains a cutaway view of the interior of the cathode. The size of and spacing between electrodes, and the voltage across the electrodes, depends upon the amount of water to be treated.

An electrolytic solution is introduced into an inlet 14 of the electrolytic cell, in accordance with the invention. The electrolytic solution can be fed into the electrolytic cell by pump or gravity flow. Gravity feed or flow is useful, for example, if the cell is used in a portable (i.e., battery operated or gasoline-powered generator) system where it is desirable to minimize the power requirements.

The electrolytic solution preferably comprises an aqueous solution containing a soluble salt, such as NaCl, KCl, LiCl, RbCl, CsCl, NH$_4$Cl, MgCl$_2$, CaCl$_2$, NaBr, KBr, etc. Sodium chloride (NaCl) is the preferred salt because it is inexpensive and readily available; however, other soluble salts may be utilized in the invention. The salt can be added to water to form the electrolytic solution, or seawater, if available, may be utilized as the electrolytic solution, without salt additives. The salt content of the electrolytic solution, when sodium chloride is used, preferably ranges between 0.1 grams/liter and the saturation value of the salt, approximately 355 grams/liter (0.0017M and 6.1M, respectively), and most preferably ranges between 20 grams/liter and 35 grams/liter (0.34M and 0.60M, respectively).

The electrolytic solution preferably travels from the cell inlet 14 to a barrier 16, where it is separated into anode and cathode areas or chambers of the cell. The primary purpose of the barrier 16 is to separate the chamber near the anode from the chamber near the cathode prior to the point where the streams exit from the cell. Preferably, the barrier is non-permeable so that the cathode and anode areas are separated, although semi-permeable membranes may be utilized in accordance with the invention. The barrier 16 may be made of the same material and integrally formed with the sealing gasket material which seals the electrolytic cell as shown in FIG. 1, such as Teflon ® manufactured by E. I. duPont de Nemours. Flow regulating means, common to the art, preferably control the respective volumes of electrolytic solution which flow to the two chambers. For example, a rotameter and control valve placed in either the anode or cathode effluent stream is effective in apportioning the flow between the anode and cathode chambers. This apportionment is desirable because the degree of contamination of the water may change. When the water is highly contaminated, it is preferable to increase the flow into the anode area, whereas if the water is only slightly contaminated, the flow to the anode area is preferably decreased. When simplicity of operation of the invention is desired, it is preferable to allow the water to flow into the anode and cathode areas at a constant rate. The volume of oxidant (anode) stream to the volume of water being treated preferably ranges from 1:1 to 1:5000. The dilution factor is highly dependent on the degree of contamination of the water and the concentration of the electrolyte used.

In any electrolytic process, the anode is the positive electrode and the cathode is the negative electrode. The resulting solutions are thus different near or at each electrode area. The following substances are most likely produced at the anode 10, in accordance with the invention, when a soluble chloride salt is present in the electrolyte: $H^+$, $OCl^-$, $Cl_2$, $H_2O_2$, chlorine free radicals, $H_2$, and $O_3$. These substances produce an anode discharge stream with a fairly low pH of approximately 2.5 to 6.0. The following substances are most likely produced or migrate from the anode 10 to the cathode 12, in accordance with the invention, when a soluble chloride salt is present in the electrolyte: $OH^-$, $Cl_2$, and $O_2$. The resulting pH of the cathode discharge stream is approximately 8.0 to 12.0. A higher volume of chlorine ($Cl_2$) is typically found in the anode stream than in the cathode stream. Chlorine generally causes ozone to decompose to a variety of products, including $ClO^{31}$ and $ClO_2$, which are effective bacterial agents. As a bacterial agent, ozone acts rapidly to lyse or rupture cell membranes. In contrast, chlorine and chlorine-containing oxidants kill by diffusing through the cell wall and inactivating the enzyme systems.

The mixed oxidants react synergistically to produce a greater sterilization effect than any of the oxidants, by themselves, in accordance with the invention. Thus, highly resistant pathogens, such as *Legionella pneumophilia*, the active agent in Legionnaires' Disease, *Giardia muris cysts*, *Bacillus subtilis* spores, *Clostridium perfringens*, *Escherichia coli*, *Pseudomonas aeruginosa*, and many other microorganisms, can be effectively sterilized by the use of the present invention.

The most effective oxidants, produced in accordance with the invention, are most likely hypochlorite, chlorine, ozone, and hydrogen peroxide. These oxidants are more concentrated on the anode side of the electrolytic cell during operation, because of increased production of oxidants at the anode and because they tend to decompose in more basic environments such as that present in the cathode area. In addition, oxidants have a better germicidal or sterilizing effect at a lower pH and thus the anode effluent stream is more effective for sterilization purposes than the cathode effluent stream. The federal standards for drinking water are a pH of between 5 and 7. The cathode stream is not added to the water to be treated because the extremely high pH of the cathode stream would increase the pH of the treated water to an unacceptable level. Since water is normally at a pH of 7, the introduction of the acidic anode stream into the water brings the treated water to an acceptable pH level.

For the reasons stated above, it is preferable to discard the cathode or waste stream via an outlet 20 in accordance with the invention. The anode or oxidant stream is introduced directly into the water to be treated via another outlet 18. Both streams can be combined and used to treat the contaminated water, but it is preferable to utilize only the anode stream as the sterilizing stream. In utilizing only the anode effluent stream as the sterilizing stream, the volume of oxidant solution necessary for sterilization is substantially less than in prior art systems. Thus, the treated water has a more desirable taste and odor and lower salt content than with prior art systems.

The cathode effluent stream can be recycled through the electrolytic cell, however, dangerous gases are often produced at the cathode. These gases would need to be vented carefully.

The present invention may be used by itself, retrofit into existing water treatment facilities, or used in conjunction with conventional facilities. An ion-exchange column can be placed in series with the present invention to remove radioactive components.

Although higher oxidant concentrations are generally produced as cell operating voltage is increased, it is preferable to operate the cell of the invention at a low voltage because such a condition could be met by a lead-acid storage battery, a panel of solar cells, or a small gasoline-powered generator. The electrolytic cell of the invention shown in FIG. 1 preferably operates in a low voltage and amperage range (10 to 40 V and 1.5 to 15 amps respectively), which is lower than prior art sterilization systems. Amperage is highly dependent upon the particular operating conditions and design of the electrolytic cell. For example, amperage typically increases with a decrease in interelectrode distance, an increase in electrode area, and an increase in salt concentration of the electrolyte.

Preferably, the electrolytic cell of the invention is operated at less than 60 amps because of the higher amounts of gases that need to be vented at higher amperages.

Figure 2:
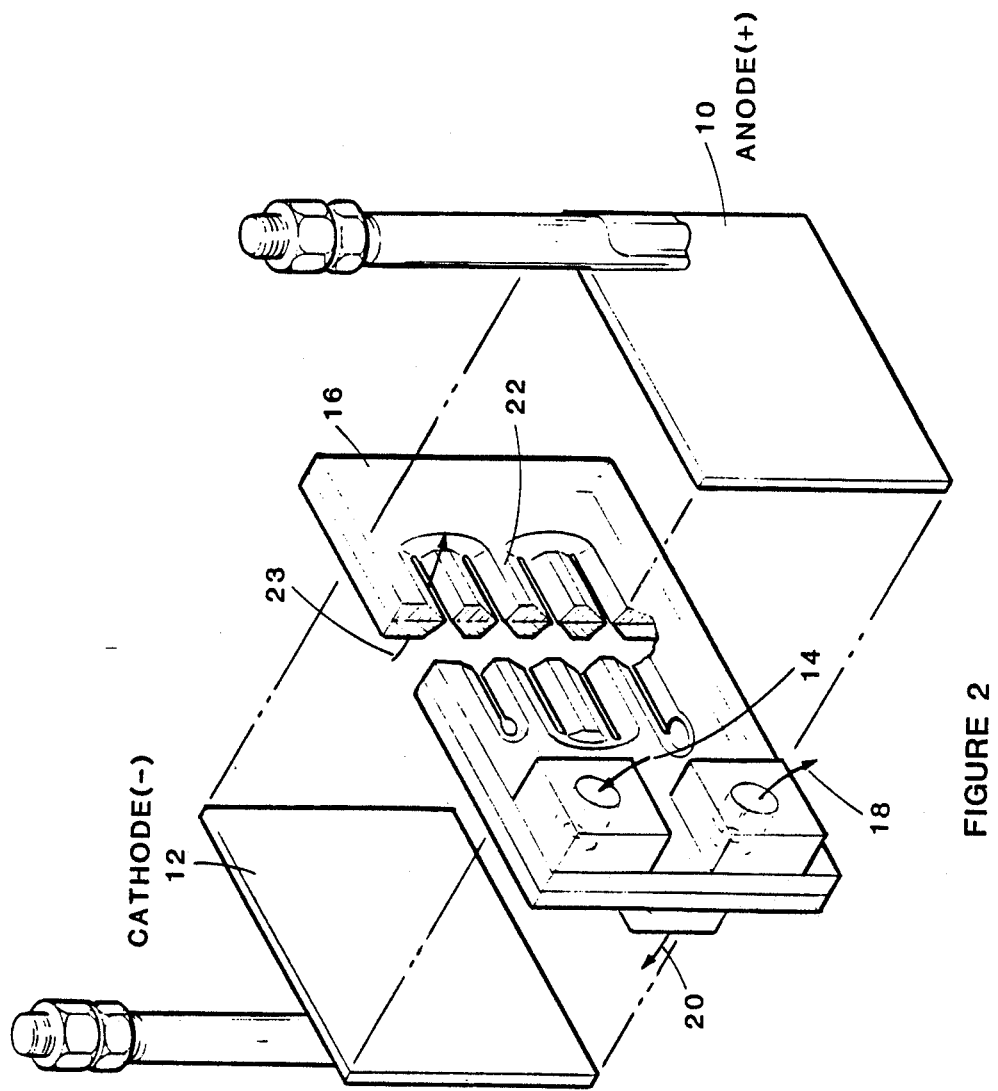
FIG. 2 is an exploded perspective view of an alternative electrolytic cell of the present invention.

FIG. 2 of the drawing illustrates an alternative embodiment of the electrolytic cell of the invention. This embodiment is particularly useful in producing turbulent flow (Reynolds Number of approximately 15,000) of the solution within the cell. The electrolytic cell design shown in FIG. 1 is useful for laminar flow (Reynolds Number of approximately 1300). Laminar flow is preferable in the operation of the electrolytic cell of the invention to avoid mixing of the streams in the anode and cathode areas within the cell chamber.

FIG. 2 shows an anode 10, cathode 12, an inlet 14 for the electrolytic solution, a barrier 16 for dividing the anode and cathode chambers, an outlet 18 for the anode or oxidant stream, and an outlet 20 for the cathode or waste stream. The flow path shown by the arrow 23 is shaped as two "V"s, oriented horizontally and intersecting at the narrow ends, which design brings about turbulent flow and minimizes but does not prevent exchange between the anode 10 contacting and cathode 12 contacting portions of the electrolyte. The barrier 16 is cut or formed to provide a long flow path through the cell, maximizing electrode contact surface. In this cell design, the flow path is folded in a serpentine fashion for economy of space, resulting in ridges 22 that separate successive segments of the flow path 23. FIG. 2 shows the inlet 14, and the outlets for the anode or oxidant stream 18 and the cathode or waste stream 20, on the same side of the cell; however, this is not a requirement of the cell design.

The preferred method of the invention for sterilizing water comprises the following steps:

(a) Form a salt solution with a soluble salt (or obtain seawater, if available);
(b) Introduce the salt solution into an electrolytic cell through an inlet port;
(c) Withdraw the anode or oxidant stream through an outlet port and introduce this stream directly into the water to be sterilized within ten minutes, preferably within five minutes, and most preferably within a few seconds; and
(d) Discard the cathode or waste stream.

Some oxidants, such as ozone and free radicals, have short half-lives and thus need to be used within minutes. Oxidants are generally more concentrated and therefore more effective when introduced within the first five to ten minutes after they are produced. The oxidants may be introduced directly into the water to be treated, or they may be stored, as long as storage is not for more than five to ten minutes.

Although ozone readily and rapidly kills microorganisms, it decomposes into divalent oxygen within 20–40 minutes of formation. A second, more stable disinfectant is required to provide a residual oxidant presence that will prevent regrowth of bacterial populations in the disinfected water. The free chlorine remains in solution, providing a long-term residual bactericidal effect. Free chlorine concentration can readily be measured by standard potable water analysis techniques as a means of verifying treatment. The U.S. Public Health Service (USPHS) recommends a free chlorine residual of 0.2 to 4.0 mg/l for potable water systems. The National Primary Interim Drinking Water Standard specifies a minimum free chlorine residual of 0.2 mg/l (EPA, 1984). Use of the present invention yields a treated water stream which meets these standards. In addition, the federal drinking water standards for fecal coliform bacteria contamination (a maximum of one colony forming unit (CFU) per 100 ml) is also met when the present invention is utilized for the sterilization of water. Microorganisms are killed within ten minutes after the oxidants are introduced into the contaminated water. The federal recommendations of $\leq 100$ mg/l of sodium and $\leq 250$ mg/l of chloride are also met utilizing the present invention. The oxidants also increase settling in the treated water, and remove tastes, colors and odors which may be present.

Figure 3:
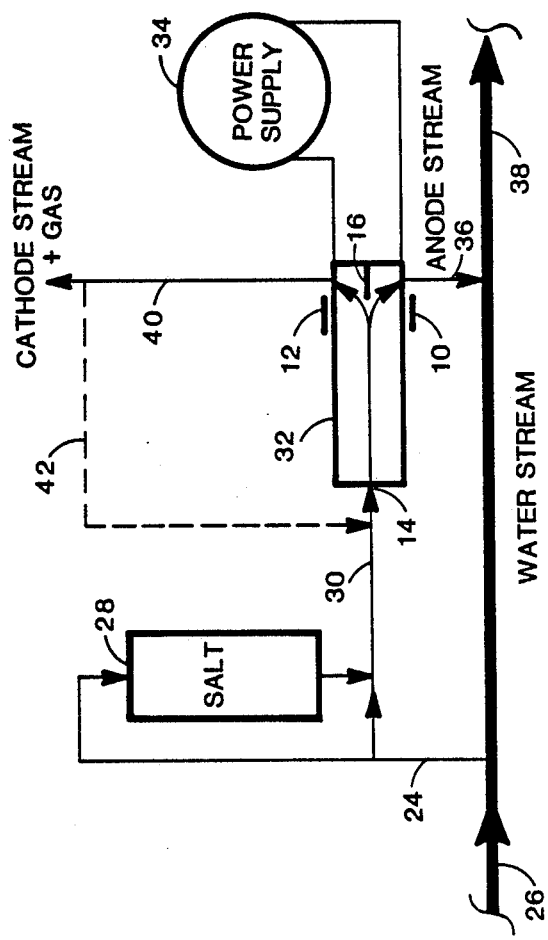
FIG. 3 is a flow diagram of a preferred method of the invention.

FIG. 3 illustrates a preferred method of the invention wherein salt is added to form the electrolytic solution. In this method, a portion 24 of the contaminated water 26 is used to form the electrolytic solution 30 by adding salt 28 to this portion 24. The electrolytic solution 30 is introduced 14 into the electrolytic cell 32 of the invention, where it is separated by a barrier 16 into the anode 10 and cathode 12 chambers of the cell. The power supply 34 may be provided by a rectified alternating current source or by battery. The anode effluent stream 36 is added to the contaminated water 26, resulting in sterilized water 38. The cathode stream 40 is preferably discarded, but may be recycled 42 as a portion of the electrolytic solution. Deleterious gases produced at the electrodes are preferably vented by means common to the art.

As mentioned previously, if seawater is available, it can be used directly as an electrolytic solution in the method and cell of the invention. This is especially useful for sterilizing water on shipboard where potable water is distilled from seawater using engine waste heat and is then stored in tanks for some period of time. Filters are useful, when seawater is used as the electrolytic solution, to filter out debris which might cause problems with the electrolytic cell. Filters are also useful in filtering out any salt crystals which have not dissolved.

EXAMPLE 1

*E. coli,* a fecal coliform bacteria, was selected as the test organism to demonstrate bacterial kill because it is the standard indicator for human sewage contamination in potable water. An initial bacterial concentration in distilled water of about $10^6$ colony forming units (CFU)/100 ml was used. This concentration corresponds roughly to the contamination level of untreated domestic wastewater, about one gram of fecal material per liter of water, a severe challenge for currently used methods of disinfection. The term CFU/ml is used in place of bacteria/ml because many bacteria may adhere in chains or clusters and form single colonies, making the experimental data based on colony counts lower than the actual number of bacteria in the sample. However, elimination of all CFUs indicates complete kill of all bacteria present.

Experimental procedures were designed to mimic a shipboard situation in which stored, distilled seawater, accidently contaminated with human sewage, would be disinfected with mixed oxidant solutions produced as described in this report. Distilled water was spiked with *E. coli,* treated with a known volume of mixed oxidant solution, and the viable bacterial population was measured following standard methods for analysis.

Glass-distilled water was contaminated with 10 ml of a 24-hr brain heart infusion (BHI) broth culture of *E. coli* diluted in phosphate buffer to yield a concentration of approximately $10^3$ to $10^6$ CFU/ml.

To determine the size of bacterial populations before treatment, the contaminated water, designated $T_0$, was serially diluted with phosphate buffer to produce a ten-fold dilution series that would include a sample of 20 to 60 colonies, the desired range for quantitative calculations. Each dilution was mixed well. Duplicate 1-ml samples were pipetted from each dilution and were filtered by negative pressure through a sterile 0.7-$\mu$m-pore-diameter Millipore ® filter. The filter holder and filter were rinsed with approximately 10 ml of phosphate buffer, and the filters were incubated in membrane-fecal coliform (M-FC) broth in a 44.5° C. water bath (fecal coliform bath) for 24 hours plus or minus one hour. The colonies were counted and the number of CFU/ml in the original control suspension was calculated.

Bacterial suspensions were then treated with the mixed oxidant solutions to measure extent of bacterial kill. Anode effluents, produced over the voltage and current range 10 to 37 V and 1.5 to 10.5 amps, respectively, were added to the control suspensions to produce a treatment ratio from 1:70 to 1:400 oxidant solution to bacterial suspension. The suspensions were mixed well and were loosely covered to retard the escape of any chlorine gas. Duplicate samples of 1, 10, and 100 ml of the oxidant-treated suspension were removed after ten and 30 minutes incubation at room temperature and were filtered as described above. The membrane filters were rinsed with dechlorinating buffer to inactivate any chlorine from the oxidant solution remaining in the filters that could inhibit the growth of the bacteria. These membrane filters were incubated with M-FC broth at 44.5° C. as described above. The filtration apparatus was sterilized between uses by exposure to ultraviolet light in a Millipore ® sterilization unit for 5 minutes.

Bacteria should not be suspended in any dilution water for more than 30 minutes at room temperature because death or multiplication may occur. Multiplication of bacteria suspended in glass-distilled water seemed unlikely, but there might be sufficient osmotic shock to result in the lysis of many bacteria. Such a decrease would confound the results of the oxidant tests. To determine whether the oxidants, not the exposure to glassdistilled water, killed the bacteria, a control bacterial suspension was prepared and incubated in glass-distilled water for 30 minutes. After ten and 30 minutes incubation at room temperature, samples of the suspension were removed, diluted, filtered and incubated as described above. Colony counts on the membrane filters were made immediately following incubation. Plates containing 1 to 60 isolated colonies showing the dark blue center characteristic of *E. coli* on this medium were accepted for counting. All counts were normalized to CFU/100 ml samples for comparison with Federal drinking water standards.

All fecal coliform bacteria were killed by the oxidant solutions, even at the greatest dilution tested, as shown in Table I. Oxidant solutions generated at 10 to 37 V and diluted from 70 to 400 times killed all fecal coliform cells within ten minutes.

Control samples incubated for ten minutes without oxidant contained $1.1 \times 10^5$ CFU/100 ml, and samples incubated for 30 minutes contained $1.7 \times 10^5$ CFU/100 ml. Few of the bacteria originally present in the suspension ($2.1 \times 10^5$ CFU/100 ml) were killed within 30 minutes when incubated in distilled water. The oxidant solution, and not the osmotic shock of distilled water, was thus responsible for the total bacterial kill.

TABLE I

INFLUENCE OF OXIDANT SOLUTION ON FECAL COLIFORM POPULATIONS

| Oxidant Solution Generating Voltage & Amperage (V) | (amp) | Treatment Ratio Oxidant Solution[a]: Contaminated Water | Colony Forming Units/100 ml | | |
|---|---|---|---|---|---|
| | | | $T_0$ | $T_{10}$ min | $T_{30}$ min |
| Control | | 0:100 | $2.1 \times 10^5$ | $1.1 \times 10^5$ | $1.7 \times 10^5$ |
| 10 | 1.5 | 1:70 | $1.9 \times 10^5$ | 0 | 0 |
| | | 1:100 | $1.9 \times 10^5$ | 0 | 0 |
| | | 1:150 | $1.9 \times 10^5$ | 0 | 0 |
| | | 1:200 | $1.9 \times 10^5$ | 0 | 0 |
| | | 1:400 | $1.3 \times 10^4$ | 0 | 0 |
| 15 | 3.0 | 1:100 | $1.1 \times 10^4$ | 0 | 0 |
| | | 1:200 | $1.1 \times 10^4$ | 0 | 0 |
| | | 1:400 | $1.1 \times 10^4$ | 0 | 0 |
| 20 | 4.0 | 1:70 | $2.1 \times 10^5$ | 0 | 0 |
| | | 1:100 | $2.1 \times 10^5$ | 0 | 0 |
| | | 1:150 | $2.1 \times 10^5$ | 0 | 0 |
| | | 1:200 | $2.1 \times 10^5$ | 0 | 0 |
| | | 1:400 | $1.3 \times 10^4$ | 0 | 0 |
| 25 | 6.0 | 1:70 | $8.3 \times 10^3$ | 0 | 0 |
| | | 1:100 | $8.3 \times 10^3$ | 0 | 0 |
| | | 1:150 | $8.3 \times 10^3$ | 0 | 0 |
| | | 1:200 | $8.3 \times 10^3$ | 0 | 0 |
| | | 1:400 | $1.3 \times 10^4$ | 0 | 0 |
| 30 | 7.5 | 1:70 | $8.3 \times 10^3$ | 0 | 0 |
| | | 1:100 | $8.3 \times 10^3$ | 0 | 0 |
| | | 1:150 | $8.3 \times 10^3$ | 0 | 0 |
| | | 1:200 | $8.3 \times 10^3$ | 0 | 0 |
| | | 1:400 | $1.3 \times 10^4$ | 0 | 0 |
| 35 | 9.5 | 1:70 | $1.2 \times 10^7$ | 0 | 0 |
| | | 1:100 | $1.2 \times 10^7$ | 0 | 0 |
| | | 1:150 | $1.2 \times 10^7$ | 0 | 0 |
| 37 | 10.5 | 1:200 | $1.2 \times 10^7$ | 0 | 0 |
| | | 1:400 | $1.1 \times 10^4$ | 0 | 0 |
| | | 1:70 | $1.5 \times 10^5$ | 0 | 0 |
| | | 1:100 | $1.5 \times 10^5$ | 0 | 0 |
| | | 1:150 | $1.0 \times 10^7$ | 0 | 0 |
| | | 1:200 | $1.0 \times 10^7$ | 0 | 0 |
| | | 1:400 | $1.1 \times 10^4$ | 0 | 0 |

[a] Oxidant solution produced from 30 grams/liter NaCl in distilled water at 0.5 liter/min.

EXAMPLE 2

In an extension of Example 1, using an all-metal electrolytic cell of the invention, water contaminated with *E. coli* was treated with oxidant solutions to produce greater dilutions, or higher treatment ratios, than those used in Example 1. The all-metal electrolytic cell was operated at 12 V, 13.5 A, a higher current flow than was achieved with the cell used in Example 1. The electrolyte solution contained 30 grams/liter NaCl. The experimental protocol was as described in Example 1.

All fecal coliform bacteria were again killed within 10 minutes by the oxidant solutions as shown in Table II. Oxidant solution generated at 12 V, 13.5 A and diluted 750 and 1000 times, killed all fecal coliform cells from an initial contamination level of $8.5 \times 10^3$ CFU/100 ml.

TABLE II

INFLUENCE OF MORE DILUTE OXIDANT SOLUTION ON FECAL COLIFORM POPULATIONS

| Oxidant Solution Generating Voltage & Amperage (V) | (amp) | Treatment Ratio Oxidant Solution[a]: Contaminated Water | Colony Forming Units/100 ml | |
|---|---|---|---|---|
| | | | $T_0$ | $T_{10}$ min |
| 12 | 13.5 | 1:750 | $8.5 \times 10^3$ | 0 |
| | | 1:1000 | $8.5 \times 10^3$ | 0 |
| Control | | 0:100 | $8.5 \times 10^3$ | $8.5 \times 10^3$ |

[a] Oxidant solution produced from 30 grams/liter NaCl in distilled water at 0.5 liter/min.

EXAMPLE 3

*Pseudomonas aeruginosa* causes eye infections in humans. American Type Culture Collection (ATCC) Strain #15442 was selected as a test organism to demonstrate bacterial kill because this strain has been identified as having broad resistance to various commercial germicides. It is the strain specified for disinfectant testing by the American Organization of Agricultural Chemists (AOAC).

Using similar protocol to that described in Example 1, glassdistilled water was contaminated with 1.6 ml of a phosphate buffer suspension of *Pseudomonas aeruginosa* cells transferred by sterile loop technique from cultures grown for 72 hours on cystine tripticase agar slants at 30° C. The initial concentration of cells in distilled water was $6.8 \times 10^4$ CFU/100 ml. The determination of bacterial population was performed as described above except that the filters were incubated in total count (MTGE) broth in a 37.5° C. dry incubator. After 24 hours plus or minus one hour, the total colonies were counted and the number of CFU/ml in the original control suspension was calculated.

Bacterial suspensions in glass-distilled water prepared as described above were then treated with mixed oxidant solutions to measure the extent of bacterial kill. Because of the success of earlier tests, only the highest two treatment ratios of oxidant to bacterial suspension, 1:750 and 1:1000 were used. Anode effluent produced from an all-metal electrolytic cell of the invention operating at 12 V, and 13.5 amps with a 30 grams/liter NaCl solution as the electrolyte was added to bacterial suspensions to produce treatment ratios of 1:750 and 1:1000. After a 20 minute incubation at room temperature, duplicate samples of 1, 10, and 100 ml of the oxidant-treated suspension were removed, filtered as described above, and the filters were incubated in total count (MTGE) broth at 37.5° C. for 24 hours.

All Pseudomonas bacteria were killed within 20 minutes by the oxidant solution, produced at 12 V, 13.5 A, and diluted 1:750 and 1:1000 as shown in Table III.

TABLE III
INFLUENCE OF OXIDANT SOLUTION ON A GERMICIDE-RESISTANT STRAIN OF *PSEUDOMONAS AERUGINOSA*

| Oxidant Solution Generating Voltage & Amperage | | Treatment Ratio Oxidant Solution[a]: | Colony Forming Units/ 100 ml | |
|---|---|---|---|---|
| (V) | (amp) | Contaminated Water | $T_0$ | $T_{10}$ min. |
| Control | | 0:100 | $6.8 \times 10^4$ | $6.8 \times 10^4$ |
| 12 | 13.5 | 1:750 | $6.8 \times 10^4$ | 0 |
| | | 1:1000 | $6.8 \times 10^4$ | 0 |

[a]Oxidant solution produced from 30 grams/liter NaCl in distilled water at 0.5 liter/min.

EXAMPLE 4

*Bacillus subtilis* is a well-known spore-forming bacteria. Spores are considered extremely difficult to kill by normal disinfection methods: spores are known to survive boiling water temperatures for an hour and can survive the usual levels of free chlorine found in municipal drinking water. ATCC Strain #19659 was selected because it is suggested for use in the standard AOAC sporicide test.

Again, similar protocol was used to that described in Example 1 above. The cells were grown on standard nutrient agar slants at 30° C. for 96 hours. Permanent slide mounts of the culture were prepared, stained, and examined at that time to verify that sporulation had taken place. The vegetative cells are readily killed but spores are difficult to kill. Sporulation was estimated at 90–95% at 96 hours.

A spore suspension was made in phosphate buffer using the sterile loop technique. The spore suspension was inoculated into glass-distilled water as described above. These were then treated with mixed oxidant solution to determine the extent of spore kill. Anode effluent produced from an all-metal electrolytic cell of the invention, operating at 12 V, 13.5 A with a 30 grams/liter NaCl solution used as the electrolyte was added to bacterial suspensions to produce treatment ratios of 1:75 to 1:1000. Duplicate samples were taken after 20 minutes and after 20 hours.

Although spore populations were reduced after a 20 minute incubation, complete spore kill was found after 20 hours (Table IV). This test demonstrates the effectiveness of the oxidant solution against spores, a very resistant bacterial form.

TABLE IV
INFLUENCE OF OXIDANT SOLUTION ON *BACILLUS SUBTILIS* SPORES

| Generation Voltage & Amperage Solution | | Treatment Ratio Oxidant Solution: Contaminated Water | Colony Forming Units/ 100 ml | | |
|---|---|---|---|---|---|
| (V) | (amp) | | $T_0$ | $T_{20}$ min | $T_{20}$ hr |
| Control | | 0:100 | $2.3 \times 10^4$ | NA[b] | $4.9 \times 10^3$ |
| 12 | 13.5 | 1:75 | $2.3 \times 10^4$ | $2.0 \times 10^3$ | 0 |
| | | 1:150 | $2.3 \times 10^4$ | $5.0 \times 10^3$ | 0 |
| | | 1:300 | $2.3 \times 10^4$ | TNTC[c] | 0 |
| | | 1:500 | $2.3 \times 10^4$ | TNTC | 0 |
| | | 1:750 | $2.1 \times 10^4$ | $1.5 \times 10^4$ | NA |
| | | 1:1000 | $2.1 \times 10^4$ | $1.4 \times 10^4$ | NA |

[a]Oxidant solution produced from 30 grams/liter NaCl in distilled water at 0.5 liter/min.
[b]Not available.
[c]Too numerous to count.

EXAMPLE 5

Samples of contaminated distilled water, treated with oxidant solutions, produced in accordance with Example 1, were stored in closed glass containers at ambient temperature (18.5°–19.5° C.) for 24 hours. During this interval, any ozone is expected to decompose due to its short half-life.

Free chlorine concentrations were determined by amperometric titration with phenylarsine using a Fisher Chlorine Titrimeter, and by N, N-diethyl-p-phenylenediamine (DPD) color formation using a sample test kit produced by HACH Co. of Loveland, Colo. To use the DPD measurement method, a 2.5 ml sample of water is mixed with the contents of a prepared reagent packet. The resulting color is compared with the five standard color steps that correspond to specific chlorine concentrations. Although this method allows a reading to be made at only 0.5 mg/l increments, it is extremely easy to use and is commonly employed in water quality studies. Results from this study may thus be compared with other work.

All samples except one had a measurable free chlorine residual 24 hours after treatment, as shown in Table V. These data show that the two methods of measuring chlorine concentration agree reasonably well. At chlorine concentrations lower than 1.5 mg/l, the color developed by the DPD reagents can be seen but a quantitative value cannot be assigned to these solutions because no reference standard is provided. Therefore, these concentrations are reported as <0.5 mg/l in Table V. Some of the differences noted between chlorine concentrations at $T_0$ and $T_{24}$ hours may be a result of chlorine demand.

TABLE V
FREE CHLORINE RESIDUAL IN DISTILLED WATER 24 HR FOLLOWING TREATMENT WITH OXIDANT SOLUTIONS

| Generation Voltage & Amperage Solution | | Treatment Ratio Oxidant Solution[a]: Contaminated Water | Free Cl$_2$ Concentration (mg/l) | | |
|---|---|---|---|---|---|
| | | | Expected at $T_0$ | Phenyl-arsine Titration at $T_{24}$ hr | HACH DPD Colorimetric at $T_{24}$ hr |
| (V) | (amp) | | | | |
| 10 | 1.5 | 1:70 | 0.39 | 0.44 | <0.5 |
| | | 1:100 | 0.29 | 0.26 | <0.5 |
| | | 1:150 | 0.18 | 0.30 | <0.5 |

TABLE V-continued
FREE CHLORINE RESIDUAL IN DISTILLED WATER 24 HR FOLLOWING TREATMENT WITH OXIDANT SOLUTIONS

| Generation Voltage & Amperage Solution (V) | (amp) | Treatment Ratio Oxidant Solution[a]: Contaminated Water | Free Cl$_2$ Concentration (mg/l) Expected at T$_0$ | Phenyl-arsine Titration at T$_{24}$ hr | HACH DPD Colori-metric at T$_{24}$ hr |
|---|---|---|---|---|---|
|  |  | 1:200 | 0.15 | 0.16 | <0.5 |
|  |  | 1:400 | 0.08 | 0.23[b] | <0.5 |
| 15 | 3.0 | 1:100 | 0.92 | 0.83 | 1.0 |
|  |  | 1:200 | 0.46 | 0.51 | 0.5 |
|  |  | 1:400 | 0.23 | 0.20 | <0.5 |
| 20 | 4.0 | 1:70 | 1.57 | 1.40 | 1.5 |
|  |  | 1:100 | 1.10 | 0.82 | 1.0 |
|  |  | 1:150 | 0.73 | 0.38 | 0.5 |
|  |  | 1:200 | 0.56 | 0.48 | 0.5 |
|  |  | 1:400 | 0.28 | 0.30 | <0.5 |
| 25 | 6.0 | 1:70 | 2.86 | 2.21 | 2.0 |
|  |  | 1:100 | 2.00 | 1.40 | 1.5 |
|  |  | 1:150 | 1.33 | 0.96 | 1.0 |
|  |  | 1:200 | 1.00 | 0.85 | 1.0 |
|  |  | 1:400 | 0.50 | 0.49 | 0.5 |
| 30 | 7.5 | 1:70 | 2.28 | 2.16 | 2.5 |
|  |  | 1:100 | 1.60 | 1.91 | 2.5 |
|  |  | 1:150 | 1.07 | 1.23 | 1.5 |
|  |  | 1:200 | 0.80 | 0.85 | 1.5 |
|  |  | 1:400 | 0.40 | 0.73 | <0.5 |
| 35 | 9.5 | 1:70 | 3.17 | 2.72 | 1.0 |
|  |  | 1:100 | 2.22 | 2.24 | 1.0 |
|  |  | 1:150 | 1.48 | 1.63 | 2.0 |
|  |  | 1:200 | 1.11 | 0 | 0 |
|  |  | 1:400 | 0.56 | 0.80 | 1.0 |
| 37 | 10.5 | 1:70 | 3.94 | 1.71 | 2.5 |
|  |  | 1:100 | 2.76 | 1.30 | 1.5 |
|  |  | 1:150 | 1.84 | 0.58 | 0.5 |
|  |  | 1:200 | 1.38 | 0.75 | 1.0 |
|  |  | 1:400 | 0.69 | 0.89 | 1.0 |
| US Public Health Service Recommendation |  |  | 0.2–4 mg/l |  |  |
| National Primary Interim Drinking Water Standard (EPA, 1984) |  |  | ≧0.2 mg/l |  |  |

[a]Oxidant solution produced from 30 grams/liter NaCl in distilled water at 0.5 liter/min.
[b]Measurement considered invalid because the T$_{24}$ hr chlorine concentration value is 3 times as large as the expected T$_0$ concentration.

EXAMPLE 6

To determine the differences among various Group VIII metal electrodes and compare the concentrations of electrolysis products, a laboratory comparison using uniform testing conditions was conducted. Two samples of dimensionally stable anode (DSA) stock were obtained from the Electrode Corporation, a subsidiary of ELTECH Systems Corporation, Chardon, Ohio. These samples were on titanium with a ruthenium oxide coating, which is used commercially to produce chlorine, and on titanium with a iridium oxide coating, which is used commercially to produce oxygen. Pairs of electrodes from each sample were fitted to the laminar flow electrolytic cell, shown in FIG. 1. Operating conditions were identical with those described in Examples 1 and 2. The anode effluents produced over the DC voltage range 10 to 37 V were tested to determine the concentrations of free chlorine and ozone.

The anode effluents produced at 10, 15, 20, 25, 30, 35, and 37 V DC current were collected in screw-cap bottles. Concentrations of free chlorine were determined by amperometric titration. Concentrations of ozone were determined by differences in dye decolorization over 4 hours. The designation of ozone is used in Table VI to indicate a mixture of short-lived strong oxidants, such as ozone and free radicals of chlorine and oxygen. The analytical technique used was decolorization of potassium indigo trisulfonate dye, measured spectrophotometrically at 600 nm.

Table VI shows the influence of electrode surface metal on concentrations of free chlorine and ozone in the anode effluent stream over the experimental voltage range. At voltages of 25 V and greater, the ruthenium oxide and iridium oxide electrodes operated at generally lower amperages than the platinum electrodes. Both ruthenium oxide and iridium oxide electrodes produced a higher concentration of free chlorine in the anode effluent than did the platinum electrodes. The iridium oxide electrodes produced a greater chlorine concentration over the voltage range and were generally superior to the other two electrodes in production of ozone. At 25 and 37 V, the iridium oxide electrodes produced the greatest concentrations of ozone measured during this investigation. The ruthenium oxide electrodes produced ozone only at 37 V. Thus, the types and quantities of oxidants produced depends largely on the anode metal used.

TABLE VI
INFLUENCE OF ELECTRODE SURFACE METAL ON CONCENTRATION OF OZONE AND FREE CHLORINE IN ANODE EFFLUENT

| Electrode Surface Metal | Volts | Amps | Ozone Conc.[a] (mg/l) | Free Chlorine Conc.[a] (mg/l) |
|---|---|---|---|---|
| Platinum | 10 | 1.5 | 2.5 | 27 |
| Iridium oxide | 10 | 2.0 | 3.4 | 96 |
| Ruthenium oxide | 10 | 1.5 | 0 | 100 |
| Platinum | 15 | 3.0 | 5.1 | 92 |
| Iridium oxide | 15 | 3.0 | 3.5 | 149 |
| Ruthenium oxide | 15 | 2.5 | 0 | 140 |
| Platinum | 20 | 4.0 | 2.9 | 120 |
| Iridium oxide | 20 | 4.2 | 4.1 | 212 |
| Ruthenium oxide | 20 | 4.0 | 0 | 154 |
| Platinum | 25 | 6.0 | 2.9 | 196 |
| Iridium oxide | 25 | 4.5 | 10.2 | 247 |
| Ruthenium oxide | 25 | 5.0 | 0 | 202 |
| Platinum | 30 | 7.5 | 1.8 | 158 |
| Iridium oxide | 30 | 7.0 | 3.4 | 279 |
| Ruthenium oxide | 30 | 6.5 | 0 | 232 |
| Platinum | 35 | 9.5 | 1.2 | 224 |
| Iridium oxide | 35 | 8.5 | 0 | 284 |
| Ruthenium oxide | 35 | 7.5 | 0 | 280 |
| Platinum | 37 | 10.5 | 3.9 | 284 |
| Iridium oxide | 37 | 9.5 | 10.6 | 369 |
| Ruthenium oxide | 37 | 9.0 | 3.4 | 326 |

[a]Anode effluent produced from 30 grams/liter NaCl in distilled water at 0.5 liter/min.

Accordingly, an improved device and method for the sterilization of water has been invented. The invention is inexpensive and simple to manufacture and operate, requires low voltage and current flow, and has greater germicidal effects than prior art systems.

Although the invention has been described with reference to these preferred embodiments, other embodiments can achieve the same results. Variations and modifications of the present invention will be obvious to those skilled in the art and it is intended to cover in the appended claims all such modifications and equivalents.

We claim:
1. A method for electrolytically sterilizing or disinfecting water comprising the following steps:
   (a) obtain an aqueous electrolytic solution;

(b) introduce the electrolytic solution into an electrolytic cell, when provided, wherein said electrolytic cell comprises:
  (i) an anode, wherein the electrolytic surface of said anode comprises a Group VIII metal or a compound thereof;
  (ii) an anode area comprising a chamber at said anode;
  (iii) a cathode, wherein the electrolytic surface of said cathode comprises a conducting meterial;
  (iv) a cathode area comprising a chamber at said cathode;
  (v) at least one inlet for introducing an electrolytic solution, when provided, into said cell;
  (vi) an outlet for allowing aqueous effluent from said anode to exit said electrolytic cell;
  (vii) an outlet for allowing aqueous effluent from said cathode to exit said electrolytic cell;
  (viii) sealing means positioned between said anode and said cathode for sealing said cell; and
  (ix) flow restricting means comprising a barrier positioned between said anode and said cathode, said barrier comprising aperture means, said aperture means being large but smaller in total cross-sectional area than either said anode or said cathode, said barrier thereby comprising at least one flow restricing body portion which extends into said cell for restrictively allowing the electrolytic solution to flow between said anode and said cathode through said aperture means;
(c) withdraw aqueous effluent from said anode area of said electrolytic cell; and
(d) introduce the aqueous anode effluent into the contaminated water to be treated.

2. A method in accordance with claim 1 wherein the aqueous anode effluent contains at least ozone, hypochlorite and chlorine.

3. A method in accordance with claim 1 wherein said flow restricting body portion of said barrier extends into said cell from one end of said cell and said aperture means is positioned on the other end of said cell.

4. A method in accordance with claim 1 wherein said barrier comprises two flow restricting body portions which extend into said cell from opposite ends of said cell and said aperture means is centrally located between said flow restricting body portions.

5. A method in accordance with claim 1 wherein voltage and current, when applied across said anode and cathode, do not exceed about 12 volts and about 20 amps, respectively.

6. A method for electrolytically sterilizing or disinfecting water in accordance with claim 1 wherein at least one of the following microorganisms selected from the group consisting of *Legionella pneumophilia*, *Giardia muris* cysts, *Bacillus subtilis* spores, and American Type Culture Collection Strain #15442 *Pseudomonas aeruginosa* is effectively sterilized.

7. A method for electrolytically sterilizing or disinfecting water in accordance with claim 3 wherein the electrolytic solution is introduced into said electrolytic cell by laminar flow.

8. A method for electrolytically sterilizing or disinfecting water in accordance with claim 4 wherein the electrolytic solution is introduced into said electrolytic cell by turbulent flow.

9. A method for electrolytically sterilizing or disinfecting water in accordance with claim 1 wherein a ratio of volume of anode effluent to volume of contaminated water to be treated ranges from 1:1 to 1:5000.

10. A method for electrolytically sterilizing or disinfecting water in accordance with claim 1 wherein the anode effluent is introduced into the contaminated water to be treated within five (5) minutes after the anode effluent is withdrawn from said electrolytic cell.

11. A method in accordance with claim 1 wherein the cathode effluent is discarded.

12. A method in accordance with claim 1 wherein the cathode effluent is recycled directly into said inlet of said electrolytic cell as a portion of the electrolytic solution.

13. A method for electrolytically sterilizing or disinfecting water in accordance with claim 1 wherein the chlorine residual of the treated water is at least 0.2 mg/l.

14. An electrolytic cell for sterilizing or disinfecting water comprising:
  (a) an anode, wehrein the electrolytic surface of said anode comprises a Group VIII metal or a compound thereof;
  (b) an anode area comprising a chamber at said anode;
  (c) a cathode, wherein the electrolytic surface of said cathode comprises a conducting material;
  (d) a cathode area comprising a chamber at said cathode;
  (e) at least one inlet for introducing an electrolytic solution, when provided, into said cell;
  (f) at least one outlet for allowing effluent to exit said cell;
  (g) sealing means positioned between said anode and said cathode for sealing said cell; and
  (h) flow restricting means comprising a barrier positioned between said anode and said cathode, said barrier comprising aperture means, said aperture means being large but smaller in total cross-sectional area than either said anode or said cathode, said barrier thereby comprising at least one flow restricting body portion which extends into said cell for restrictively allowing the electrolytic solution to flow between said anode and said cathode through said aperture means.

15. An electrolytic cell in accordance with claim 14 wherein said flow restricting body portion of said barrier extends into said cell from one end of said cell and said aperture means is positioned on the other end of said cell.

16. An electrolytic cell in accordance with claim 15 wherein said outlet for allowing effluent to exit said cell is positioned near the end of said cell from which said flow restricting body portion of said barrier extends.

17. An electrolytic cell in accordance with claim 14 wherein said barrier comprises two flow restricting body portions which extend into said cell from opposite ends of said cell, said aperture means being substantially centrally located between said flow restricting body portions.

18. An electrolytic cell in accordance with claim 14 wherein said flow restricting body portion of said barrier is nonpermeable.

19. An electrolytic cell in accordance with claim 18 wherein said flow restricting body portion of said barrier is integral with said sealing means.

20. An electrolytic cell in accordance with claim 14 wherein said cell comprises two outlets; one outlet for withdrawing aqueous effluent from said anode area and a second outlet for withdrawing aqueous effluent from said cathode area.

21. An electrolytic cell in accordance with claim 14 wherein at least ozone, hypochlorite and chlorine are produced in an aqueous solution when said electrolytic cell is being operated.

* * * * *